(12) United States Patent
Ben-David et al.

(10) Patent No.: US 7,017,028 B2
(45) Date of Patent: Mar. 21, 2006

(54) APPARATUS AND METHOD FOR UPDATING POINTERS FOR INDIRECT AND PARALLEL REGISTER ACCESS

(75) Inventors: Shay Ben-David, Haifa (IL); Jeffrey Haskell Derby, Chapel Hill, NC (US); Thomas W. Fox, Hopewell Junction, NY (US); Fredy Daniel Neeser, Langnau am Albis (CH); Jamie H. Moreno, Dobbs Ferry, NY (US); Uzi Shvadron, Aviv (IL); Ayal Zaks, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 327 days.

(21) Appl. No.: 10/389,212

(22) Filed: Mar. 14, 2003

(65) Prior Publication Data

US 2004/0181646 A1    Sep. 16, 2004

(51) Int. Cl.
*G06F 12/00*    (2006.01)
(52) U.S. Cl. .................... 711/220; 711/217; 711/218; 711/219
(58) Field of Classification Search ........ 711/217–220; 712/4, 7, 22
See application file for complete search history.

(56) References Cited

U.S. PATENT DOCUMENTS

| | | | | |
|---|---|---|---|---|
| 5,357,618 A | * | 10/1994 | Mirza et al. | 711/3 |
| 5,657,781 A | * | 8/1997 | Steverson | 134/144 |
| 5,850,227 A | * | 12/1998 | Longhenry et al. | 345/671 |
| 5,953,512 A | * | 9/1999 | Cai et al. | 712/205 |
| 6,023,564 A | * | 2/2000 | Trimberger | 703/23 |
| 6,308,252 B1 | * | 10/2001 | Agarwal et al. | 712/22 |
| 6,665,790 B1 | * | 12/2003 | Glossner et al. | 712/4 |

* cited by examiner

*Primary Examiner*—Than Nguyen
(74) *Attorney, Agent, or Firm*—Robert M. Trepp; F. Chau & Associates, LLC

(57) ABSTRACT

An apparatus and method are provided for updating one or more pluralities of pointers (i.e. one or more vector pointers) which are used for accessing one or more pluralities of data elements (i.e. one or more vector data elements) in a multi-ported memory. A first register file holds the vector pointers, a second register file holds stride data, and a plurality of functional units combine data from the second register file with data from the first register file. The results of combining the data are transferred to the first register file and represent updated vector pointers. Furthermore, a third register file is provided for holding modulus selector data to specify the size of a circular buffer for circular addressing.

30 Claims, 3 Drawing Sheets

APPARATUS AND METHOD FOR UPDATING POINTERS FOR INDIRECT AND PARALLEL REGISTER ACCESS

BACKGROUND OF THE INVENTION

1. Field of the Invention

The present invention relates generally to computer architecture and, more particularly, to an apparatus and method for updating pointers to facilitate indirect and parallel data access.

2. Background of the Invention

In state-of-the-art digital signal processors (DSPs), media processors, and various other domain-specific processors, a single-instruction multiple-data (SIMD) approach is often taken for parallel execution of a single operation on one or several vectors of data elements. In most contemporary register-to-register architectures (also known as load-store architectures), the data elements involved in SIMD operations are located in a register file.

For typical algorithms executing on these processors, such as those that implement digital filtering, it would be desirable to allow for flexible read and write access to the data elements of the vectors, that is, to the individual registers in the register file. Furthermore, it would be advantageous for access to the registers not to be limited to a contiguous range of registers nor restricted with respect to vector alignment.

SUMMARY OF THE INVENTION

An apparatus and method are provided for updating one or more pluralities of pointers (i.e. one or more vector pointers) which are used for accessing one or more pluralities of data elements (i.e. one or more vector data elements) in a multi-ported memory. A first register file holds the vector pointers, a second register file holds stride data, and a plurality of functional units combine data from the second register file with data from the first register file. The results of combining the data are transferred to the first register file and represent updated vector pointers. Furthermore, a third register file is provided for holding modulus selector data to specify the size of a circular buffer for circular addressing.

The ability to access one or more vector data elements for use in a SIMD manner, whose elements are organized in a random, non-contiguous fashion, is achieved through indirect access by one or more vector pointers. The vector data elements may reside in a multi-ported register file or a multi-ported memory. The vector pointers preferably reside in a vector pointer register file (VPRF), and provide independent indices for accessing the disjoint vector data elements. With this approach, a vector instruction may address one or several vectors, each one composed of one or more data elements, simply by specifying one or several vector pointers. The register file or memory of data elements may contain many elements and would require a significant number of bits in the instruction to address those elements. By contrast, the VPRF preferably contains fewer vectors and therefore could require fewer bits in the instruction to address said vector pointers, by virtue of the fewer number of vector pointers in the VPRF, and by virtue of the fact that the pointers are being accessed as vectors, N at a time, where "N" is the number of elements in the vector. In vector instructions, vector pointers may be used to specify one or several source vectors and/or a target vector. This imposes a requirement to provide parallel access to multiple vector pointer operands in the VPRF. In addition, for algorithms containing several vector instructions in sequence, a mechanism is required for updating vector pointers, so that sequences of vectors can be accessed efficiently.

Preferably, the apparatus is capable of being programmed. Instructions for updating pointers can be either in update form or no-update form. The instructions in update form include vector pointer update operations, which may be implicitly or explicitly specified. The explicit vector pointer update operations include explicit vector pointer increment operations. Among the vector pointer update operations are those that perform various bit manipulation operations, e.g., masked bit reversal, masked bit rotation, masked bit shifting. Other instructions for programming the apparatus include initialization instructions for initializing the pointers in the first register file. The pointers may be initialized, for example, with specified values, values from registers, and values loaded from memory.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
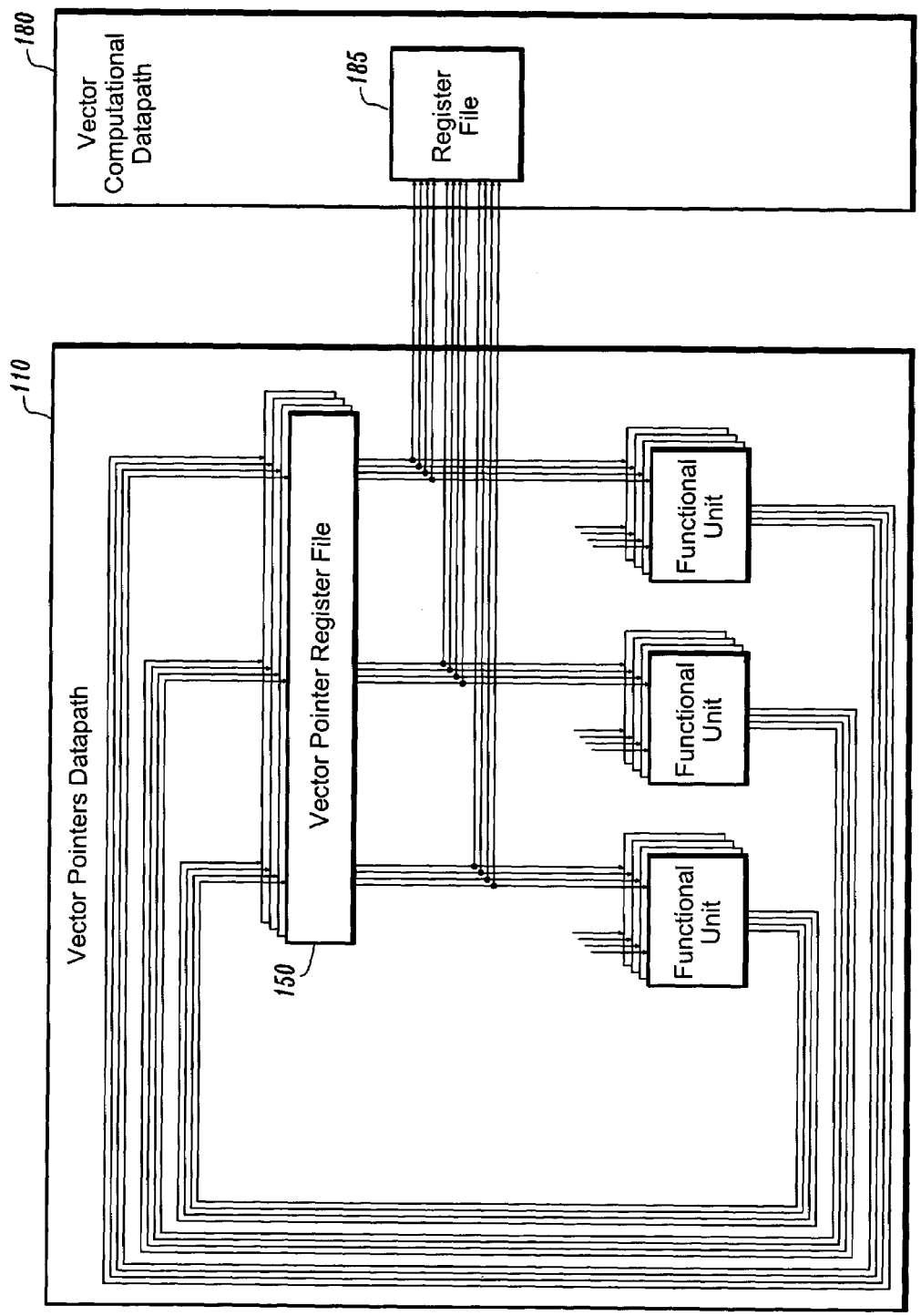
FIGS. 1 and 2 illustrate indirect register file addressing schemes within a processor architecture.

Referring to FIG. 1, an exemplary processor architecture is illustrated. The processor architecture shown in FIG. 1 is based on "Digital Signal Processor With SIMD Organization and Flexible Data Manipulation," by Moreno et al., U.S. application Ser. No. 10/197,733, filed on Jul. 18, 2002, which is incorporated by reference in its entirety.

As shown in FIG. 1, a vector pointers datapath (VPD) 110 includes a vector pointer register file (VPRF) 150. The VPD 110 executes instructions whose result values are stored in the VPRF 150, and which are indices to a register file 185 included in a vector computational datapath (VCD) 180. The VPD 101 executes explicit and implicit operations. The explicit operations include arithmetic or logic operations on either one register and operands from other register files, or on two registers. The implicit operations include an update that adds either a constant value or an immediate value to a register, and arithmetic or logic operations on a register and either an implicit or explicit value, or a second register.

Figure 2:
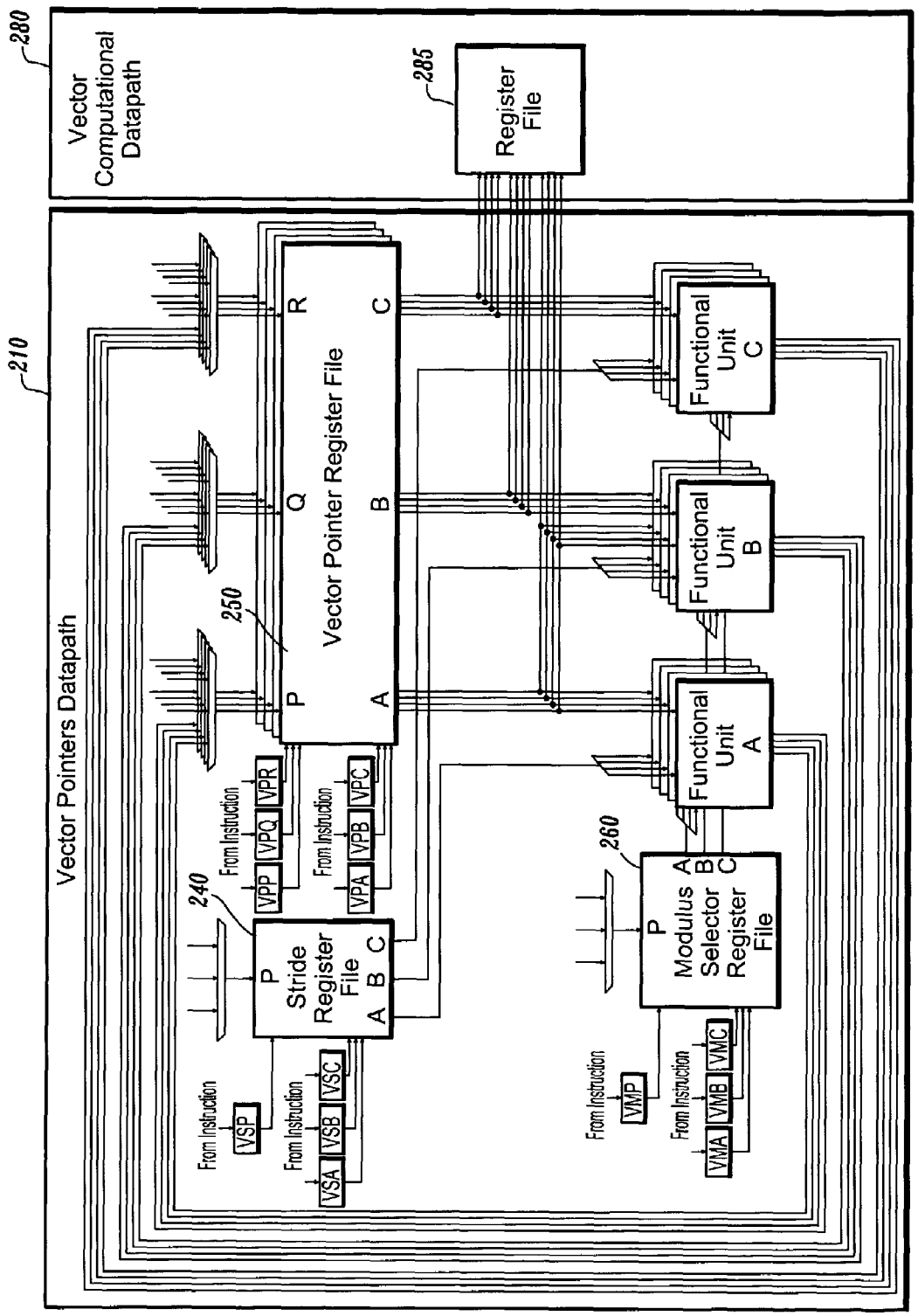

Referring to FIG. 2, an improved processor architecture is illustrated. A vector pointers datapath 210 includes three sets (A, B, C) of N functional units available for updating vector pointers stored in a vector pointer register file (VPRF) 250. The VPRF 250 provides parallel read and write access for write-back of updated vector pointers. FIG. 2 shows three read ports and three write ports. A value of N=4 was chosen. However, the description applies for any positive integer value of N.

For vector pointer implicit updating with linear or circular addressing, a dedicated stride register (SR), included in a stride register file (SRF) 240, is provided for each vector pointer register (VPR) in the VPRF 250. A SR is selected in one of the following ways.

Selection of the SR is provided by the same field in the instruction that specifies the VPRs used to access the vector data elements of a multi-ported memory ("VPA" or "VPB"), as shown in Table 1. In this case, that field in the instruction would be placed into both the "VPA" and "VSA" or "VPB" and "VSB" address inputs to the VPRF and SRF, respectively.

TABLE 1

| opcode | destination | source A | source B |
|---|---|---|---|
| | VPT | VPA | VPB |

Selection of the SR is provided by an update control field ("UA" or "UB") in the instruction, as shown in Table 2, which can operate as follows:
"00"—selection of the SR is provided by the same field in the instruction that specifies the VPRs used to access the vector data elements of a multi-ported memory ("VPA" or "VPB").
"01"—the elements of the VPR are NOT updated.
"10"—a predefined SR is used for updating the VPR (e.g. SR 14)
"11"—a predefined SR is used for updating the VPR (e.g. SR 15)

TABLE 2

| opcode | destination | source A | source B | cntl T | cntl A | cntl B |
|---|---|---|---|---|---|---|
| | VPT | VPA | VPB | UT | UA | UB |

Selection of the SR is provided by a different field ("VSA" or "VSB") in the instruction than that which specifies the VPRs used to access the vector data elements of a multi-ported memory ("VPA" or "VPB"), as shown in Table 3.

TABLE 3

| opcode | destination | source A | source B | stride A | stride B |
|---|---|---|---|---|---|
| | VPT | VPA | VPB | VSA | VSB |

Each SR provides a common displacement, which is added to all the elements of a vector pointer during the update operation.

For circular addressing, a dedicated modulus selector register (MSR) 260 is provided for each vector pointer register. The MSR 260 is used to specify the size of a circular buffer. For a given modulus selector ω, circular addressing is defined as arithmetic modulo the interval [β, β+R−1], where $R=2^\omega$ is the circular addressing range and β is the circular addressing base aligned on a $2^\omega$ boundary. The allowed values for the circular addressing range are 2, 4 8, 16, 32, 64, 128, 256, 512, 1024, 2048, and 4096; the base value must be aligned on a boundary that matches the circular addressing range. If the result of a circular addressing operation falls outside the range specified by the modulus selector, the value wraps around the corresponding range. Linear addressing is achieved through the degenerate case of circular addressing, namely by setting the associated MSR to $N_{VP}$, where $N_{VP}=\log_2$ (VE), and VE is the number of Vector data Elements in the implementation.

In addition to vector pointer update operations performed implicitly with vector instructions (i.e. vector pointer auto-update operations), the present invention supports explicit vector pointer operations through vector pointer compute instructions such as vector pointer increment operations and vector pointer add operations. Functional Unit B has add and increment capabilities, whereby two vector pointers and one stride are fed as inputs to Functional Unit B. In the case of a vector pointer add operation, the two vector pointers are added together and the result is written back to a VPR over write port Q. In the case of a vector pointer increment operation, one vector pointer and one stride are added together and the result is written back to a VPR over write port Q.

In addition to vector pointer arithmetic operations, the invention supports other bit manipulation operations on the vector pointers such as bit reversal and bit rotation. These operations are performed in Functional Unit C. FIG. 2 shows how one vector pointer, and possibly one stride and one modulus selector are used in these operations. Results are written back to a VPR over write port R. It should be appreciated that other operations such as bit shifting could also be implemented without departing from the spirit and scope of the present invention.

For initialization of VPRs, vector pointer set instructions are provided for simultaneously setting the N elements of a VPR either to arbitrary index values, or to values that reflect pre-specified patterns, such as all identical, or successive values in increasing or decreasing order. The values are set via write port R of the VPRs. Multiplexors at the input to write port R control which data is passed to the port depending on the instruction. To set all of the elements in a VPR simultaneously, long instructions are provided with immediate fields for each element, as well as the SR and MSR.

For initialization of VPRs, instructions are provided for moving the contents of other registers in the processor architecture into the vector pointer registers, such as replicating a scalar (integer) register across all the elements of a vector pointer register, using a scalar register as the seed for a pattern such as successive increasing or decreasing values, copying the contents of other vector pointer registers, or copying the contents of other vector registers in the architecture. Values from other registers in the architecture are moved into the VPRs at write port R. The copying of one VPR to another is achieved by reading the values to be copied out of Read Port B and writing those values to the target VPR at write port Q. Control logic sets the appropriate read and write indices and write enables during the appropriate cycle, as always. The multiplexors at the input to write port Q control which data is passed to the port depending on the instruction.

For initialization of VPRs, instructions are provided for loading the contents of VPRs with values read from memory. Conversely, instructions are provided to store the contents of VPRs in memory. Loads occur over write port R, while for stores, data is read from read port C.

For initialization or updating VPRs, an element-by-element masking mechanism is provided wherein an N-bit mask value specifies whether each of the N elements of the destination VPR is actually updated. Control logic in the VPU, using N mask values from a Vector Mask Register, controls the write enables separately to each of the N elements of the VPRs. A mask address, VMS, is provided in the instruction, as is a field, M, with which the mask is compared to determine whether the VPRs are updated or not, as shown in Table 4.

TABLE 4

| opcode | destination | source A | source B | cntl T | cntl A | cntl B | mask | control |
|---|---|---|---|---|---|---|---|---|
| | VPT | VPA | VPB | UT | UA | UB | M | VMS |

For additional flexibility in the manipulation of VPRs, support is provided for element-wise manipulation operations, such as shifting and rotating the entire elements of a VPR. For example, in the case of a left shift of a VPR, and assuming elements are numbered in left to right order starting from 0, the new contents of element 0 are the previous contents of element 1, the new contents of element 1 are the previous contents of element 2, the new contents of element 2 are the previous contents of element 3, and the new contents of element (N–1) are the previous contents of element (N–1). In the case of a left rotate, everything is the same as in the left shift, with the exception that the new contents of element (N–1) are the previous contents of element 0. These operations read a VPR from read port B in FIG. 2, and write to write port Q. The multiplexors at the input to write port Q control which data gets written to the VPRs. The operation is similar to the copying operations described above, but with the VPRs that were read being mapped to the multiplexor inputs differently, namely, shifted by one element to facilitate the element-wise shift operation.

For additional capabilities in the manipulation of VPRs, support is provided for the selection of a value for each element among pairs of values. For example, an N-bit mask specifies which one of each pair of values is chosen, on an element-by-element basis. If the i-th mask bit is 0 then the first value from the i-th pair is placed into the i-th element of the target VPR; on the other hand, if the i-th mask bit is 1 then the second value from the i-th pair is placed into the i-th element. The pairs of values are provided by VPR read ports A and B, whose values are routed to the multiplexors at write port R. The selection of the value which gets written on an element by element basis is controlled by the same facilities which control the writing of load, move, and set instructions.

The vector pointers datapath 210 may be implemented in a pipelined fashion, and may employ the traditional pipelining techniques therein.

Figure 3:
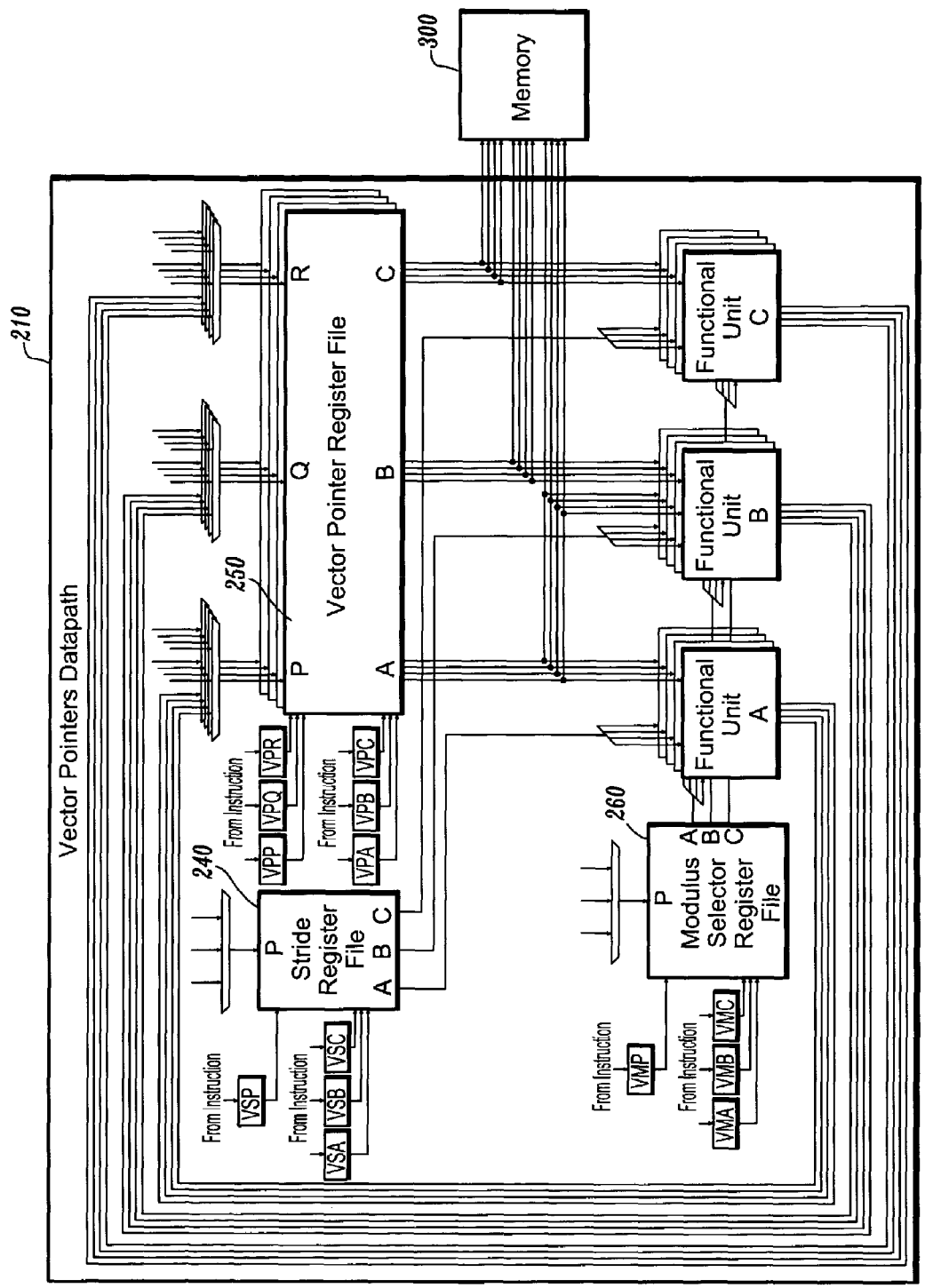
FIG. 3 illustrates a more general case of the indirect register file addressing of FIG. 2 in which a multi-ported memory is addressed.

The vector pointers datapath 210 has been described in the context of addressing the contents of a large, multi-ported register file. FIG. 3 shows the general case where the vector pointers datapath 210 is configured to address the contents of a large, multi-ported memory 300. In general, the disclosed unit can be used to address the contents of other storage structures, such as banked memories, without departing from the spirit and scope of the invention.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for updating vector pointers for accessing vector data elements of a multi-ported memory, comprising:
   a first register file for holding vector pointers;
   a second register file for holding stride data; and
   a plurality of functional units for combining data from the first register file with data from the second register file; wherein results of combining the data from the first register file with the data from the second register file are transferred to the first register file and used as updated vector pointers to the vector data elements.

2. The apparatus of claim 1, wherein a dedicated stride register is provided for each of the vector pointers in the first register file.

3. The apparatus of claim 2, wherein the dedicated stride registers are selected.

4. The apparatus of claim 2, wherein the dedicated stride registers are contained in the second register file.

5. The apparatus of claim 2, wherein the dedicated stride registers provide displacements.

6. The apparatus of claim 1, further comprising a third register file for holding modulus selector data for circular addressing to specify the size of a circular buffer.

7. The apparatus of claim 1, wherein the apparatus is programmable with instructions.

8. The apparatus of claim 7, wherein the instructions for programming the apparatus include instructions in either update form or no-update form.

9. The apparatus of claim 8, wherein the instructions in update form include vector pointer update operations.

10. The apparatus of claim 9, wherein the vector pointer update operations include implicit vector pointer update operations.

11. The apparatus of claim 9, wherein the vector pointer update operations include explicit vector pointer update operations.

12. The apparatus of claim 11, wherein the explicit vector pointer update operations includes explicit vector pointer increment operations.

13. The apparatus of claim 9, wherein the vector pointer update operations include bit manipulation operations.

14. The apparatus of claim 13, wherein the bit manipulation operations include one or more of masked bit reversal, masked bit rotation, and masked bit shifting.

15. The apparatus of claim 7, wherein the instructions for programming the apparatus include pointer initialization instructions.

16. A method of updating vector pointers for accessing vector data elements of a multi-ported memory, comprising:
    providing vector pointers in a first register file;
    providing stride data in a second register file; and
    combining data from the second regisier file with data from the first register file;
    wherein results of combining the data from the first register file with the data from the second register file are transferred to the first register file and used as updated vector pointers to the vector data elements.

17. The method of claim 16, wherein the step of providing stride data includes providing a dedicated stride register for each of the vector pointers in the first register file.

18. The method of claim 17, wherein the dedicated stride registers are selected.

19. The method of claim 17, wherein the dedicated stride registers are contained in the second register file.

20. The method of claim 17, wherein the dedicated stride registers provide displacements.

21. The method of claim 16, further comprising the step of providing a third register file for holding modulus selector data used in circular addressing for specifying the size of a circular buffer.

22. The method of claim 16, wherein the methods steps are performed using a programmable apparatus.

23. The method of claim 22, wherein instructions for programming the apparatus include instructions in either update form or no-update form.

24. The method of claim 23, wherein the instructions in update form include vector pointer update operations.

25. The method of claim 24, wherein the vector pointer update operations include implicit vector pointer update operations.

26. The method of claim 24, wherein the vector pointer update operations include explicit vector pointer update operations.

27. The method of claim 26, wherein the explicit vector pointer update operations includes explicit vector pointer increment operations.

28. The method of claim 24, wherein the vector pointer update operations include bit manipulation operations.

29. The method of claim 28, wherein the bit manipulation operations include one or more of masked bit reversal, masked bit rotation, and masked bit shifting.

30. The method of claim 22, wherein instructions for programming the apparatus include pointer initialization instructions.

* * * * *